United States Patent [19]

Alexander et al.

[11] Patent Number: 4,631,625

[45] Date of Patent: Dec. 23, 1986

[54] MICROPROCESSOR CONTROLLED CIRCUIT BREAKER TRIP UNIT

[75] Inventors: James O. Alexander, Clarkston; William A. King, Lithonia; William E. May, Lawrenceville; Von G. Pardue, Duluth, all of Ga.

[73] Assignee: Siemens Energy & Automation, Inc., Atlanta, Ga.

[21] Appl. No.: 655,152

[22] Filed: Sep. 27, 1984

[51] Int. Cl.$^4$ .............................................. H02H 3/08
[52] U.S. Cl. ...................................... 361/94; 361/47; 364/483
[58] Field of Search ............................ 361/42, 46–49, 361/43, 94, 102; 364/481, 483, 492

[56] References Cited

U.S. PATENT DOCUMENTS

| | | | |
|---|---|---|---|
| 4,276,605 | 6/1981 | Okamoto et al. | 364/481 |
| 4,338,647 | 7/1982 | Wilson et al. | 361/96 |
| 4,423,459 | 12/1983 | Stich et al. | 361/94 |
| 4,497,010 | 1/1985 | Funahashi | 361/93 |
| 4,550,360 | 9/1985 | Dougherty | 361/93 |

OTHER PUBLICATIONS

Micro-electric Circuits, Adel S. Sedra and Kenneth C. Smith, HRW Series in Electrical & Computer Engineering, CBS College Publishing.

Primary Examiner—A. D. Pellinen
Assistant Examiner—Jeffery A. Gaffin
Attorney, Agent, or Firm—F. W. Powers; J. L. James

[57] ABSTRACT

A microprocessor based trip unit for a circuit breaker is disclosed. The instantaneous current magnitudes in each phase and in the neutral of the circuit being protected are simultaneously and sequentially sampled by respective sample and hold circuits. The measured values are then applied to a respective analog-to-digital converter and the digitized values are sequentially applied to a microprocessor. The microprocessor calculates true RMS current and sums the signals of all phases and neutral to determine presence and magnitude of a ground fault current. To permit use of an 8-bit microprocessor, while maintaining high resolution of measured current over a large range, novel automatic scale adjustment is provided. The memory of prior thermal history of the circuit breaker is provided electronically by a capacitor circuit which is discharged at a rate representative of the rate of cooling of the circuit breaker. The output of the capacitor circuit is loaded into the microprocessor when the circuit breaker comes back onto the line after a prior opening operation. Any desired number of trip units can be remotely located from a switchboard frame containing a respective plurality of circuit breakers without local trip units.

18 Claims, 12 Drawing Figures

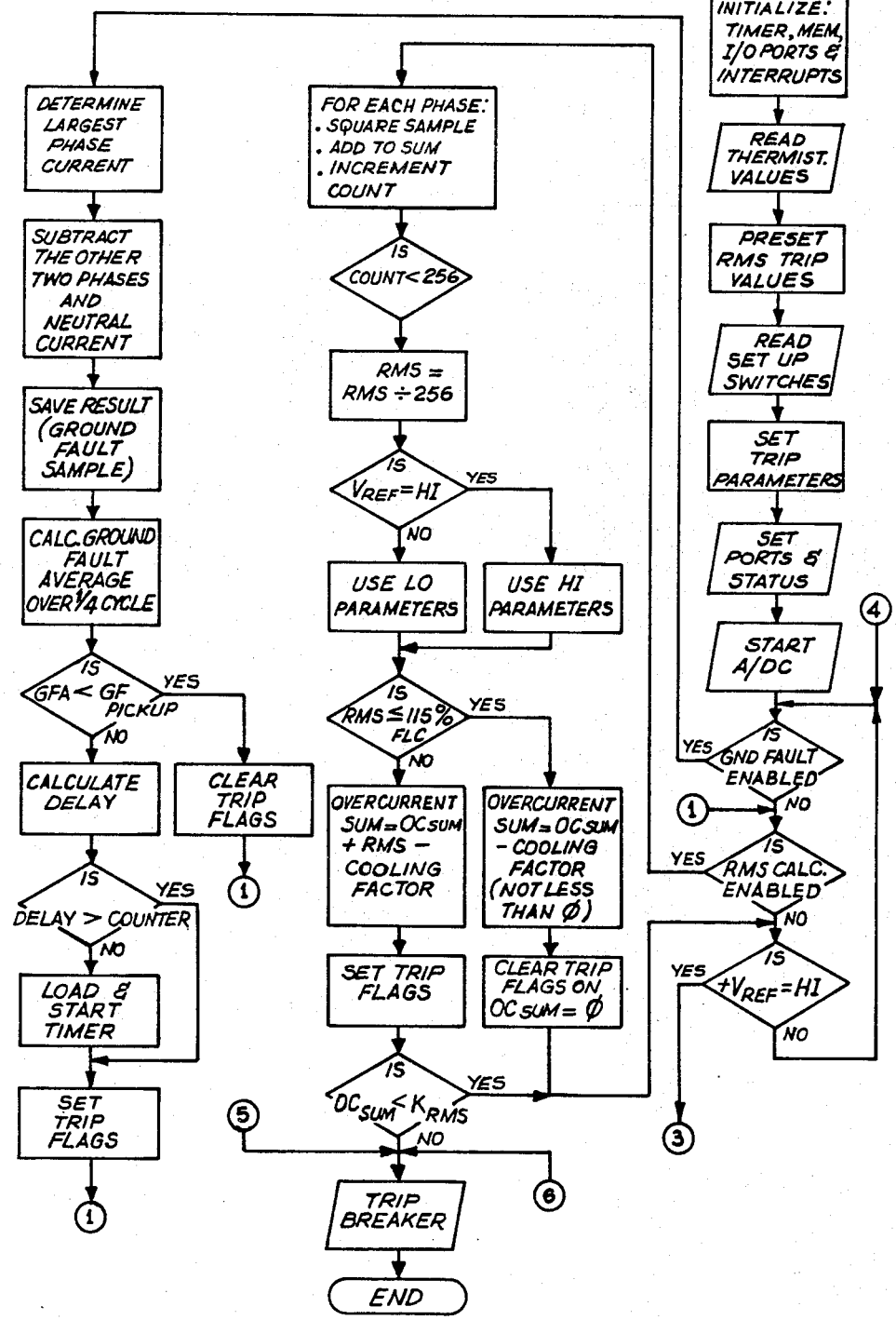

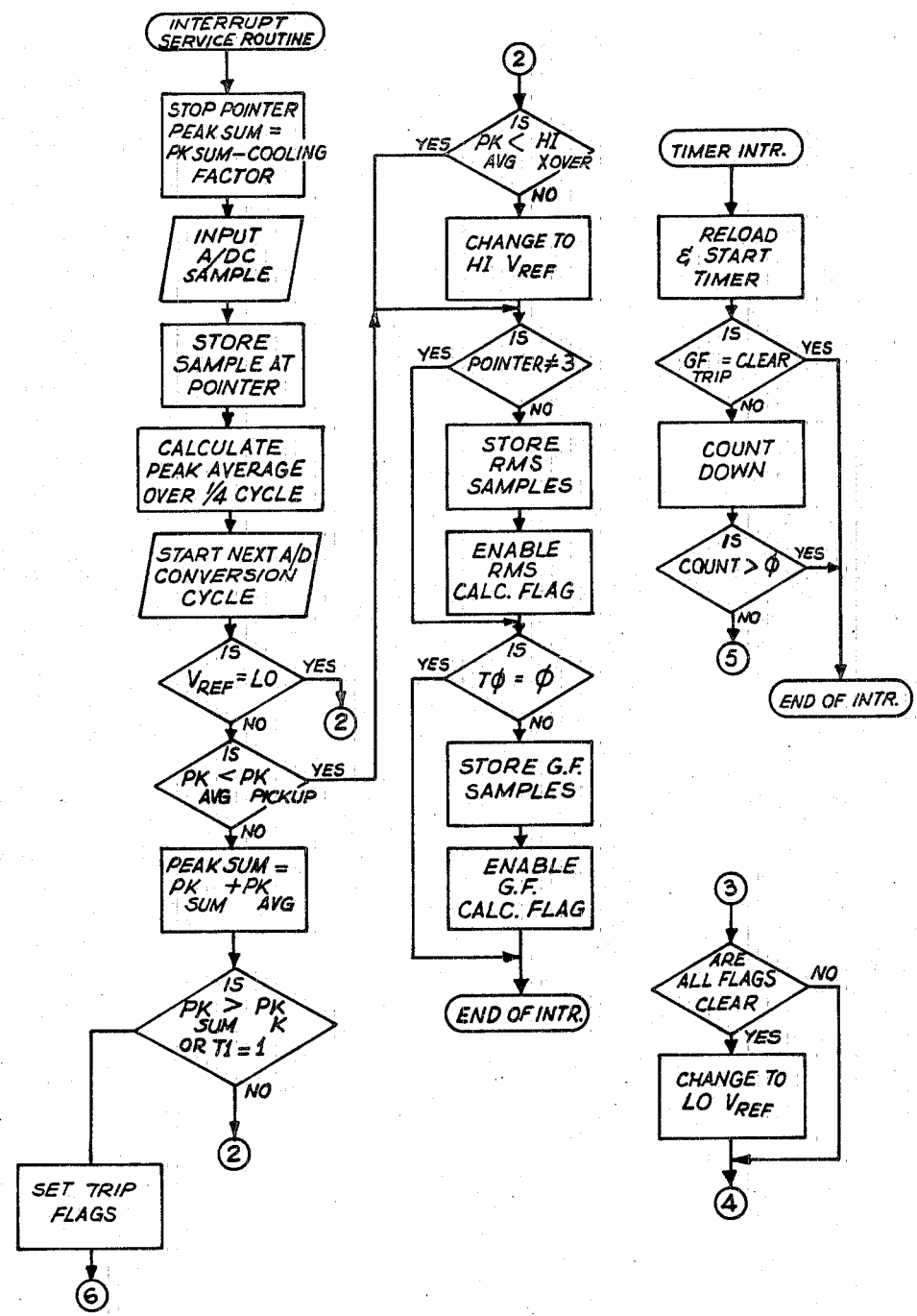

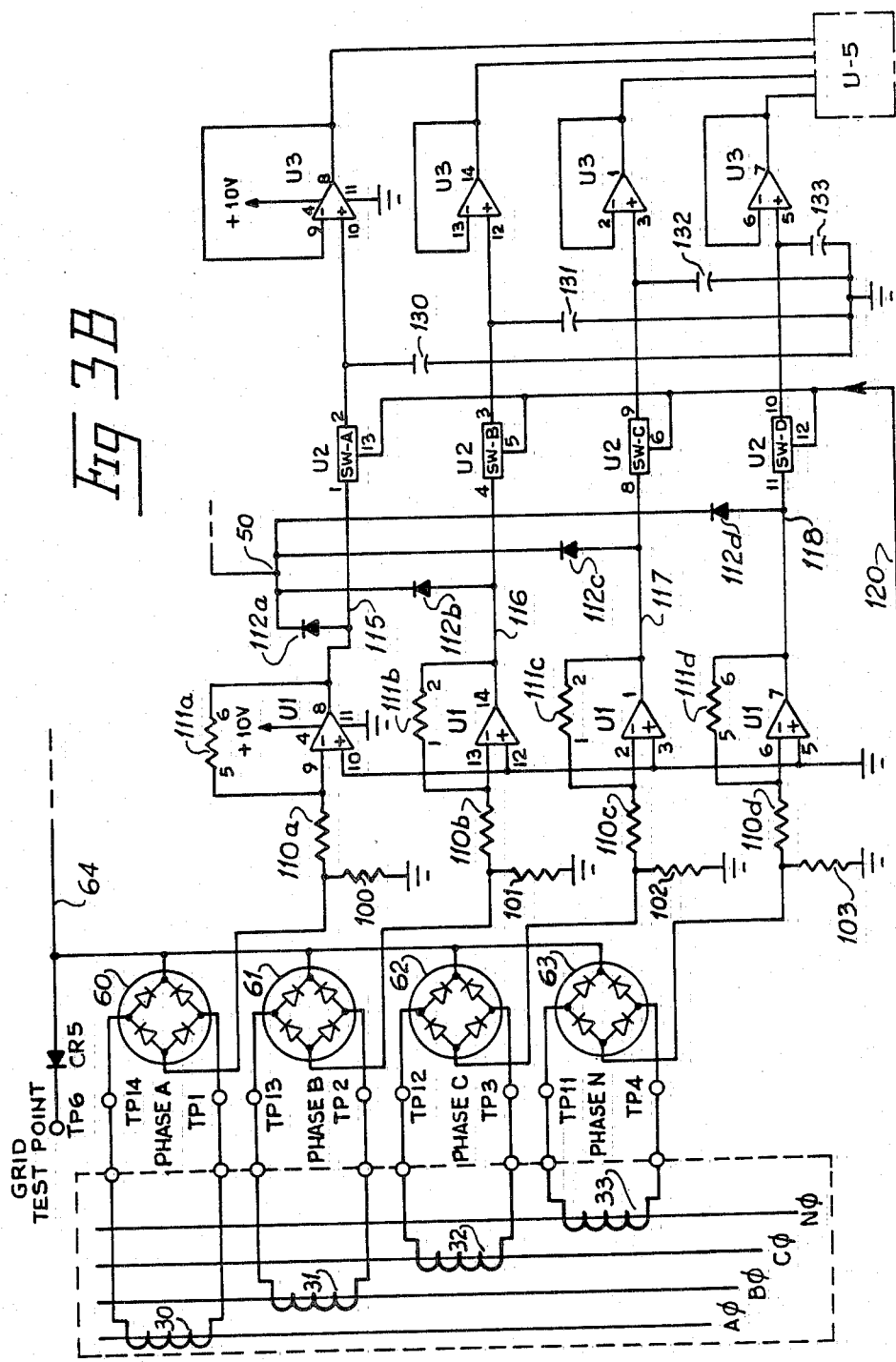

MICROPROCESSOR CONTROLLED CIRCUIT BREAKER TRIP UNIT

BACKGROUND OF THE INVENTION

This invention relates to a trip unit for a circuit breaker and more specifically relates to a microprocessor-based trip unit.

Trip units for circuit breakers are used to automatically operate the circuit breaker under fault current conditions. The time required for the circuit breaker to open will depend on the fault current magnitude and nature. Trip units, for many years, employed a bimetal member which responded in a predetermined manner to relatively low fault current and an electromagnetic trip member which responded to higher fault current magnitudes.

Trip units which employ digital electronic circuits and mircoprocessors to simulate the behavior of bimetal and electromagnetic trip units are also known. Trip units of these types are typically shown, for example, in U.S. Pat. Nos. 4,423,459, dated Dec. 27, 1983, in the name of Frederick A. Stich and Conrad F. Williams; and 4,338,647, dated July 6, 1982, in the name of Wilson et al.

Digital and microprocessor based trip units of the prior art use combinations of analog and digital circuitry. The units, however, do not perform a true RMS load current measurement, and require additional circuits and transformer components to perform ground fault current analysis. Moreover, prior units have limited accuracy over the full current measurement range and do not take accurate account of the prior thermal history of the circuit breaker.

Prior art current sensing systems for electronic trip units employ a current transformer in each phase and in the neutral, if a neutral is used. The current transformer outputs are applied to respective full-wave, bridgeconnected rectifiers. The rectified output of each line is then filtered and applied to a level detection circuit. The measured peak level is then scaled to 0.707 to produce an output which, supposedly, is related to the RMS current of each respective line. A signal related to the measured RMS current is then applied to timing circuits which cause circuit breaker tripping when measured current of a given magnitude exists for given times.

A major problem in prior art electronic trip units is that the RMS current measured is correct only if the current wave shapes measured are perfect sine waves. If the wave shape in non-sinusoidal, the scaling factor is wrong. For example, in circuits having appreciable line capacitance, such as inverter drives, the current wave shape contains substantial distortion from the sinusoidal shape. In circuits containing transformers, a third harmonic component is present in the wave shape, making it non-sinusoidal. Other sources of distortion of the current wave shape from the sinusoidal shape are well known. As a result of this inaccuracy, the circuit breaker may trip falsely and unnecessarily on too low a line current, or the circuit breaker may not trip when it should, because of the inaccurate measurement.

Circuits are known, which correct the above inaccurate measurement. For example, the output of the measuring current transformer can be connected to a resistor and the temperature of the resistor can be measured, to obtain a true RMS reading. Such a system is expensive and responds too slowly to current changes to be useful for electronic trip units.

Commercially available semiconductor chips exist which produce an RMS output. Such chips, however, are too expensive for use in electronic trip units for circuit breakers.

Sampling systems are also known, in which the instantaneous amplitude of a wave is periodically measured. By measuring a sufficient number of samples each cycle and squaring the value of each sample, and then summing and taking the square root of the sum of the squares, the RMS measurement can be obtained, its accuracy increasing with the number of samples taken. The effective number of samples can be increased by phase shifting the beginning of the measuring point for each sample in each subsequent half cycle. Such asynchronous sampling can be used to obtain the RMS value of any periodic wave shape. However, when this technique is applied to electronic trip units, the circuits become complex and expensive, since the measurement must be made separately for each of the phases and the neutral, if a neutral is provided.

As will be seen, the present invention provides a simple and inexpensive circuit for true RMS current measurement.

Another problem with existing electronic trip units is that they require intermediate current transformers for each phase and for the neutral circuit. Typically, these transofrmers are connected in wye, and are needed to produce a ground fault signal. Such current transformers are expensive and occupy considerable volume in the control housing.

As will be seen, the need for such separate intermediate transformers is eliminated by the present invention.

Another problem with prior art microprocessor based systems is that measurement resolution is poor, requiring relatively large microprocessors. By way of example, it is desirable to use an 8-bit microprocessor because of its low cost. If, however, it is desired to be able to discriminate currents from one-fourth full load (for ground fault detection) to ten times full load current, the current range is 1 to 40. If full load current is 600 amperes, the difference between ten times full load current and one-fourth full load current is (6,000−150)=5850 amperes. An 8-bit microprocessor provides 256 unique 8-bit combinations. Thus, the individual steps are: 6,000/256=23.44 amperes. This provides a resolution of about 23.44A/150A=16% here the 150 amperes is 25% of 600 amperes. However, a resolution of about 5% or less is desired. Therefore, a simple 8-bit microprocessor cannot be used, while still having appropriate resolution.

As will be later seen, the invention provides a novel automatic scale adjustment to permit requisite accuracy, while using an 8-bit microprocessor.

A further problem with existing digital circuits is in the means for providing thermal memory. Thus, in a standard circuit breaker trip unit, the history of prior heating of the breaker due to prior interruption operation, or prior heating caused by closing on capacitive loads, and the like, stays with the breaker. In prior art digital systems, the effect of the thermal history of the breaker was lost after the breaker opens. As will be seen, the present invention provides circuit means for retaining thermal memory.

Still another problem in existing trip systems is that the trip winding of the magnetic latch of the circuit breaker has a large number of turns and thus high inductance. Therefore, it is hard to deliver a trip signal rapidly to the coil because the trip circuit with the coil has a large time constant. Accordingly, when the breaker is operated with very high speed current limiting breakers, it is hard to coordinate the performance of the breakers.

BRIEF DESCRIPTION OF THE INVENTION

In accordance with the present invention, a novel microprocessor based trip unit is provided, which employs, as major components, a power supply, a sample and hold circuit for each line, an analog-to-digital converter, a microprocessor, and configuration switches for setting the adjustment parameters of the trip unit. The circuit is applicable to both three and four wire systems. Opening of the circuit breaker is accomplished by a conventional mechanical mechanism which is activated by an electromagnetic latching mechanism triggered by the electronic trip unit.

The power supply provides full-wave, rectified current from the three phase lines and neutral. It then generates a +5 volt power source for all logic circuits, and also produces a positive reference voltage for the analog-to-digital (A/D) converter. The positive reference voltage is either +1 volt or +5 volts, depending on the state of a control signal from the microcomputer. The power supply is capable of delivering 25 milliamperes when the line current is only 25% of its rated load current, which rated current may, for example, be 600 amperes.

Signals representative of the line and neutral current are derived from the lines by the same current transformers, and are converted to voltage waveforms, using high precision resistors. The signal values are inverted and are in the range of 0 to +5 volts, with +5 volts representing 20 times the frame rated current.

In accordance with one important aspect of this invention, all four signals (if a neutral is present) are sampled repetitively and simulataneously, and the sampled signals are used to charge respective capacitors. A sample is taken about every 1,500 microsecond (about 11 samples/cycle for a 60 Hz. line), and continues for about 100 cycles to produce about 1,100 samples for each RMS measurement cycle. Sequentially, the output of the sample and hold circuit for each line is read out into a single A/D converter. The conversion to a digital value takes about 100 microseconds, using an 8-bit converter having an accuracy of ±1 least significant bit.

The simultaneously sample signals of each line are then sequentially applied to the microcomputer which, using a conventional program, calculates the true RMS current for each line.

The microcomputer also uses the processed simultaneously sampled signals to calculate a ground fault current. That is, if the sum of the line and neutral currents is not zero, there must be a ground fault. Since signals of the three phases and neutral are simultaneously sampled, and accurate RMS values are available, ground fault current can be calculated from the information in the microcomputer.

In order to adjustably set the parameters of current rating, instantaneous trip current, ground fault pickup current and ground fault delay time, respective externally adjustable binary coded decimal switches are provided which can be addressed individually, and read by the mircocomputer. Based on the settings of these switches, and the readings from the A/D converter, the microcomputer calculates a time to trip the circuit breaker. If the current does not decrease, and the calculated time arrives, the microcomputer issues a trip signal.

From the above, it is seen that the novel system of the invention employs true RMS current measurement. Moreover, ground fault current is accurately calculated in the microcomputer, since simultaneously measured line and neutral current values are available, eliminating the need for intermediate current transformers.

The system employs an 8-bit microprocessor, yet carries out these operations with high resolution by scale switching. Thus, one current scale is used for currents less than, for example, one and a half times rated current. If rated current is 600 amperes, over the 900 ampere range, there are 900/256=3.52 amperes per bit. For a ground fault current of one-fourth rated current (150 amperes), the resolution is 3.52/150=2.3%. It is, in fact, ±1.2% which is very satisfactory resolution.

At currents greater than 900 amperes, current scale is dynamically switched so that, for ten time load current, the amperes per bit is 6,000/256, which yields the same minimum accuracy.

The novel trip unit of the present invention also has simulated thermal memory. The memory consists of thermistors fixed on the bus bars which act as the primary windings of the current transformer pick-ups for the system. The thermistors are negative temperature coefficient devices, and their resistance will be related to the amount of heat ($I^2t$) stored in the circuit breaker. Their resistance is thus used to preset the current level and time-out functions of the microprocessor.

Alternatively, the thermal memory may employ a capacitive storage circuit and a separate A/D converter channel. The heating effect on the circuit breaker due to high current is taken into account by charging the capacitor to a level related to the breaker energy ($I^2t$). When the breaker trips, the charge on the capacitor bleeds off at a rate related to the cooling rate of the breaker. When the breaker is again closed, the capacitor level is read through the A/D converter channel, and the value measured is used to preset the energy level and time-out functions of the microprocessor.

The magnetic latch of the circuit breaker using the trip unit of the invention has a novel split winding structure. Thus, present windings for trip latches have a large number of turn, for example, 6,500 turns of 40 gauge wire. This coil has high inductance so that the trip circuit containing the coil has a long time constant, for example, 8 to 10 milliseconds. In many applications, for example, those using a current limiting breaker, the magnetic latch must trip within 3 to 4 milliseconds. If the magnetic latch is too slow, the high speed current limiting breaker will trip before the magnetic latch reacts. The novel split winding of the invention provides a continuous magnetic latch winding with two sections, a 6,600 turn section and a 110 turn section. When high speed operation is called for, a high trip voltage is available. The large turn winding is then bypassed and sufficient current flows through the 110 turn section to provide enough ampere turns to trip the latch in a very short time.

A further feature of the invention is the use of an EProm with the microprocessor with a switch for selecting certain predetermined trip characteristics which are applied to the main microprocessor.

Also provided for the breaker is a thermal override, such that the magnetic latch of the operating mechanism is released if the unit temperature exceeds 85° C.

The novel trip unit of the invention can be packaged compactly and housed with its respective circuit breaker. Alternatively, the trip unit can be mounted remotely of the circuit breaker. For example, for switchboard frames containing a plurality of circuit breakers, the circuit breaker trip units can be contained in a single control location with appropriate input and output lines interconnecting the breakers with their respective trip units. In arrangements such as this, the local trip units can share certain common parts, such as common power supplies, data processing and the like.

BRIEF DESCRIPTION OF THE DRAWINGS

FIG. 2 is a flow chart for the microprocessor of the block diagram of FIG. 1.

FIGS. 3A, 3B and 3C are parts of an overall schematic diagram of the detailed circuit and microprocessor of the present invention.

DETAILED DESCRIPTION OF THE INVENTION

Figure 1:
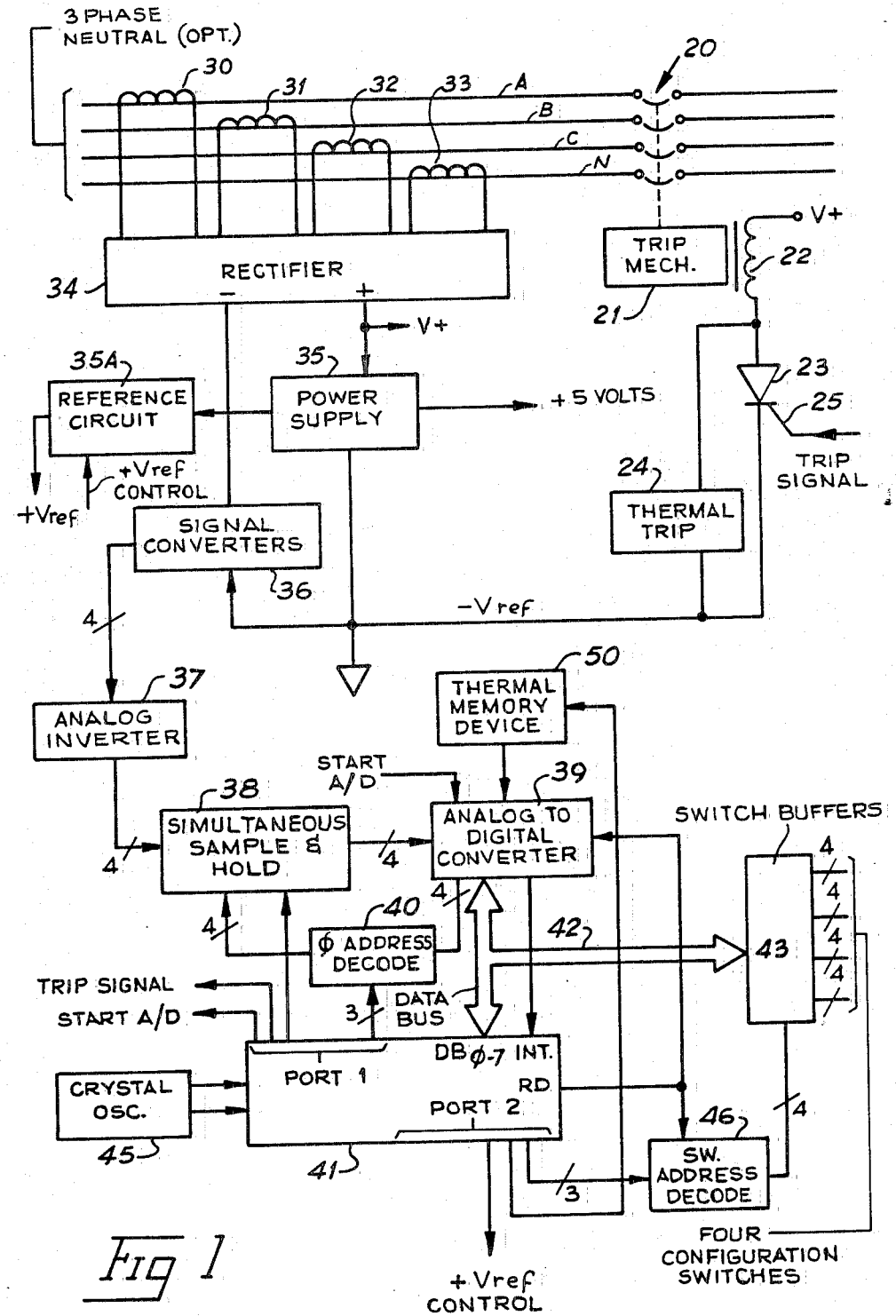
FIG. 1 is a block diagram of the novel microprocessor implemented electronic trip unit of the present invention.

Referring to FIG. 1, there is first schematically illustrated a three-phase a-c power line containing phases A, B and C and a neutral line N which may or may not be provided in the circuit. The circuit breaker 20 is schematically illustrated as having four poles for the phases A, B, C and the neutral N, respectively. Circuit breaker 20 may be a conventional circuit breaker of relatively low voltage and having a rated current, for example, of 600 amperes. Obviously, any desired rating can be used for the circuit breaker. Circuit breaker 20 can be contained in metal insulated switchgear along with any desired number of other circuit breakers having the same and different ratings.

Circuit breaker 20 contains a trip mechanism 21 which can be a conventional type of electromagnetic trip mechanism, operable in response to a current through the trip coil 22 of the trip mechanism 21. Trip coil 22 can be energized from a positive voltage supplied by rectifier device 34 upon the firing of a silicon controlled rectifier (SCR) 23 which is in series with the coil 22. Trip coil 22 can be the split coil of a magnetic latch, as will be later described. A thermal trip circuit 24 can also be provided to cause a switching action in parallel with SCR 23 when the temperatur of circuit breaker 20 exceeds some preset value, for example 85° C.

The purpose of the present invention is to apply a trip signal to the gate electrode 25 of SCR 23 under certain circuit conditions in the circuit protected by the circuit breaker 20.

Conventional current transformers 30, 31, 32 and 33 are provided on phases A, B, C and netural N, respectively. The outputs of these transformers are applied to an appropriate rectifier device 34 which conventionally consists of respective single-phase full-wave bridge connected rectifier circuits for each of windings 30–33, respectively. This arrangement will be described later in more detail.

The output of rectifier 34 is connected to power supply circuit 35. Power supply circuit 35 produces a 5-volt control power output for controlling components of the trip mechanism, as well as the logic circuit components to be later described. Power supply 35 also puts out a positive 12 volts to the reference citucit 35A that supplies a voltage $V_{ref}$ which is adjustable, using $V_{ref}$ control, between at least two values, for example 3.5 volts and 0.56 volt to the output $+V_{ref}$ of an analog to digital converter to be described. This circuit operates to switch the reference voltage $V_{ref}$ to provide automatic scaling, as will later be described. Switchover can occur, for example, at a measured current of 1.5 times the rated current of the circuit breaker 20. Switching the reference level produces an automatic scaling type operation, so that relatively high resolution in the measuring circuit is obtained at a low current scale region, making it possible to use 8-bit microprocessors with the requisite accuracy of current measurement at critical current levels.

The output of rectifier 34 is also applied through signal converter circuits 36 which individually convert the output current signals of rectifier 34 to respective voltage signals. The output of signal converter circuits 36 are then applied to the analog inverter 37 which inverts their polarity from a negative to positive.

Each of the individual signals derived from lines A, B, C and N are then applied to a simultaneous sample-and-hold circuit 38. The simultaneous sample and hold circuit 38 takes a sample simultaneously from each of the outputs of current transformers 30–33 once very 1500 microseconds, or 11 times in each cycle of a 60 Hz system.

At the time the simultaneous samples are taken, each signal A, B, C and N charges a respective capacitor to a voltage level representative of each respective instantaneous phase current. The charge of each capacitor is then sampled sequentially and converted, by the analog to digital converter 39, to a digital value representative of the instantaneous current of that phase which is then sent to the microcomputer 41. The address and decode circuit 40 coordinates this activity which is ultimately controlled by the microcomputer 41. Approximately every 100 cycles, the RMS current is computed arithmetically from these samples.

A data bus 42 interconnects the microcomputer 41 with the analog-to-digital converter 39 and with switch buffer circuits 43, which are, in turn, connected to four respective configuration switches for setting values of current rating, instantaneous trip, ground fault pickup and ground fault delay, respectively. Any desired number of configuration switches can be used, for any desired respective parameters. These switches are binary coded decimal switches which are located externally of the control circuits so that they can be easily manually adjusted. Also provided, as shown in FIG. 1, is a crystal oscillator 45 and a switch address decoder circuit 46 connected between the microcomputer 41 and the switch buffers 43.

Also provided in FIG. 1 is a thermal memory device 50 which may be a thermistor or capacitive circuit. When using a capacitive circuit, which is charged just before tripping by the microcomputer 41 to a value representative of the thermal condition fo the circuit breaker, discharge circuit means are provided within device 50, such that, when the circuit breaker is open and its parts cool, the capacitive or other structure within thermal memory device 50 is discharged or cools at the same rate. When the circuit breaker is reclosed, the output remaining in the thermal memory device 50 is read back into the system and all trip levels are appropriately adjusted to take into consideration the prior thermal history of the circuit breaker. When using thermistors for the thermal memory, they are preferably negative temperature devices mounted on the main bus bars within the circuit breaker, and are read by the microprocessor as described above.

Outputs from the microcomputer 41 include the $+V_{ref}$ control output, which is applied to reference circuit 35 in order to adjust the $+V_{ref}$ level to obtain the desired automatic scaling of the reference output.

A trip signal is derived from port 1 of the microcomputer 41, which is the trip signal to be applied to SCR 23 under appropriate computed circumstances. A start A/D signal is also derived from microcomputer 41, which signal is applied to the analog-to-digital converter 39 so that samples are taken from the simultaneous sample and hold circuits.

FIGS. 2A and 2B shows a flow chart for the microcomputer of FIG. 1. This same flow chart is applicable to the circuit of FIGS. 3A, 3B and 3C, which shall be later described.

The flow chart analysis may begin with the start at the top, right of FIG. 2A. Following the start operation, the system is initialized, including initialization of timer memory, input/output ports and interrupts. Thereafter, the thermistor values in the thermal memory device 50 are read and the RMS trip values are preset in accordance with the thermal history of the breaker a determined by the thermistory values. The set up switches connected to the switch buffers 43 are then read and the trip parameters appropriately set. Thereafter, the ports and status are set and the analog to digital converter 39 is started.

A measurement is then made as to whether the ground fault circuit is enabled. If not, a determination is made as to whether the RMS calculate instruction has been enabled. If not, a determination is made as to whether the reference voltage is at its high level. If not, a subroutine comes back to the determination of a ground fault enabling condition.

In the above sequence, if it was determined that the ground fault was enabled, the flow chart moves to the left in FIG. 2A and a determination is made of the largest phase current. This is subtracted from the current measured in the other two phases and the neutral current and the result is placed in storage. This is a ground fault current sample. Thereafter, a calculation is made of the ground fault average over ¼ cycle and a decision is then made as to whether the ground fault average current is less than the ground fault pick-up current.

If the ground fault average is less than the ground fault pick-up, the trip flags, which are displayed in the beginning, are cleared so that the circuit can continue in its operation as will be later described. If, however, the ground fault average is found to be not less than ground fault pick-up the delay is calculated and a determination is made of whether the delay is greater than that of the counter. If it is, the trip flags are immediately set. If not, the value is loaded into the timer circuit and the timer is started so that the trip flags will be set after a given length of time.

Returning to the right column of FIG. 2A, starting with the start, it is noted that if it is found that the voltage reference is high, an output to numeral 3 is applied. This output is found in the lowermost right hand column of FIG. 2B and it is seen that a determination is made as to whether all flags are clear. If they are, then it is possible to switch to the low voltage reference. If not, an output numeral 4 is produced corresponding to the indicated location in the right column.

Returning to the flow chart of FIG. 2A, and the position where determination is made of whether RMS calculation is enabled, if it is enabled, the flow chart proceeds as indicated. Thus, for each phase, the microprocessor will square the sample measured, add it to the sum and then increment the count. A determination is then made of whether the count is less than 256. If not, an RMS calculation is made in which the RMS value is divided by 256. It is then determined whether the reference voltage is high and, if so, high parameters are used, and if not, low voltage reference parameters are used.

Thereafter, a determination is made as to whether the RMS current measured is less than or equal to 115% of the full load current. If not, the over current sum is made equal to the over current sum plus the RMS value minus the cooling factor and the trip flags are set. A decision is then made as to whether the over current sum is less than the sum RMS constant value. If not, the breaker is tripped and the sequence is ended. If the RMS value was found to be less than or equal to 150% of full load current, a determination is made as to whether the over current sum equals the over current sum minus the cooling factor.

Thereafter, the trip flags are cleared when the over current sum is equal to zero. In this condition, or if the over current sum is found less than an RMS current, there is an output to the right column of FIG. 2A, where a decision is made as to whether the reference is high and the flow chart proceeds as previously described.

When the breaker is tripped and the sequencing is ended, it will be noted that trip flags are also set. These same trip flags may be set by the interrupt service routine shown in the left column of FIG. 2B. In this column, the interrupt service routine begins to step a pointer from a peak sum equal to a peak value sum minus a cooling factor. This is then applied to the input of the analog to digital converter which samples the instantaneous value being delivered. The sample is then stored at the pointer and a calculation is made of the peak average over ¼ cycle.

Thereafter, the next analog to digital conversion cycle is started and a decision is made as to whether the voltage reference is low. If the voltage referenc is high, then a second decision is made as to whether the peak average current is less than the peak pick-up. If not, a decision is made as to whether the peak sum is greater than some constant value. If it is, the trip flags are set and the breaker is tripped. If not, a routine is initiated which follows the routine shown in the second column from the right in FIG. 2B. This same routine is initiated if the voltage reference is found to be low.

In the routine shown in the second column to the right of FIG. 2B, a decision is made as to whether the peak average is less than some predetermined high value. If not, the system switches to the high reference voltage value. Thereafter, a determination is made of whether the pointer is not equal to 3. If not, then the RMS samples are stored and the enabled RMS calculation flag is raised. The next decision made is whether the total currents measured are zero. If not, there is a ground fault and the ground fault samples are stored and the enabled ground fault calculation fault is raised. This terminates the interrupt sequence.

The sequence shown to the very right hand side of FIG. 2B starts with a timer interrupt which initiates reloading and starting of the timer. Thereafter, a decision is made as to whether the ground fault current trip system is cleared. If it is, the interrupt routine ends. If it is not cleared, there is a countdown and a decision is made of whether the count is greater than zero. If it is not, an output to numeral 5 is taken to the central column of FIG. 2A, which initiates the tripping of the breaker.

In carrying out the above process with the microcomputer 41, it will be clear that the desired program will be stored, for example, in a dedicated microprocessor or an E PROM or ROM. The switch table data and timing data may also be stored in a suitable ROM.

Figure 3A:
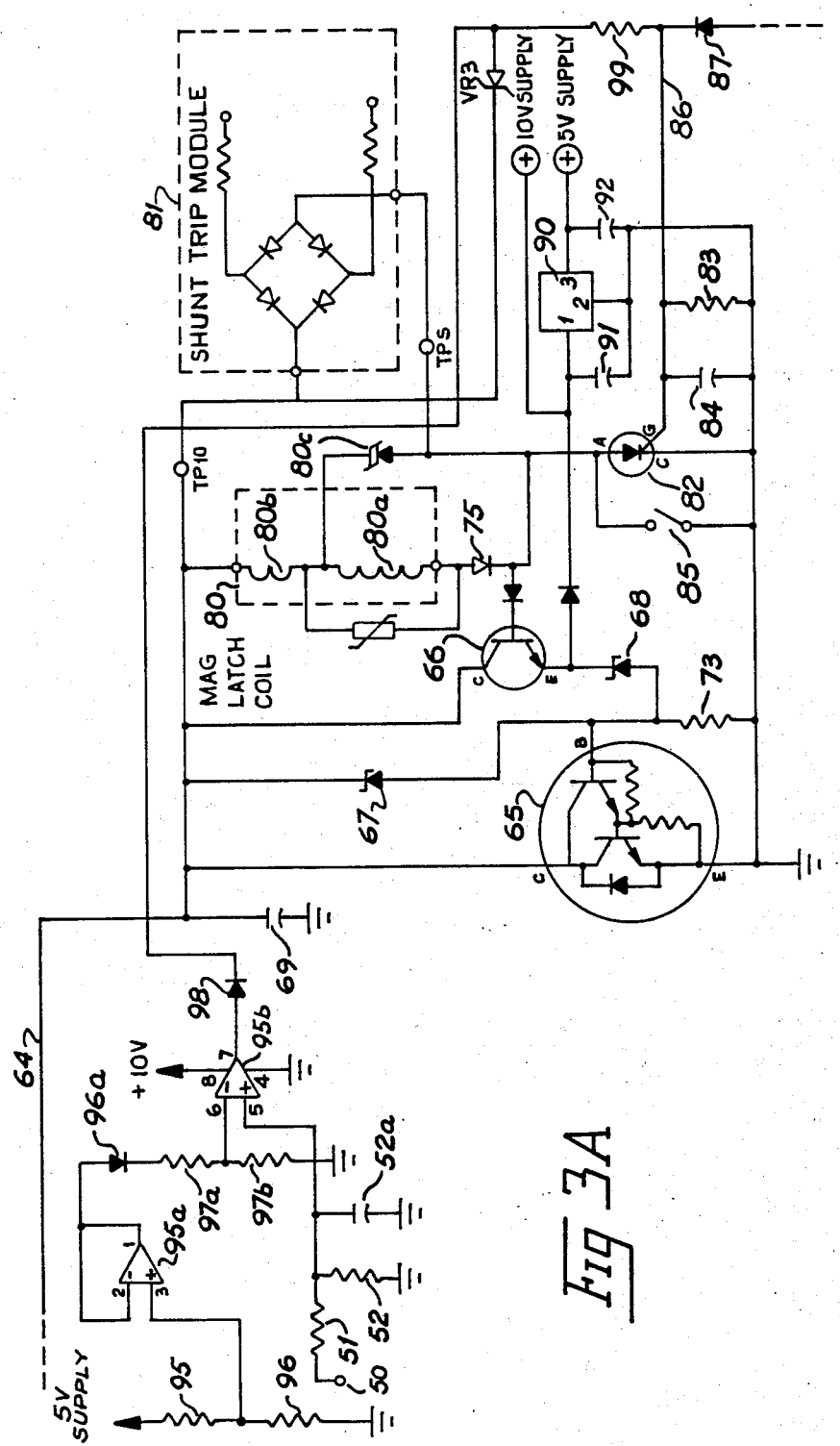
Figure 3C:
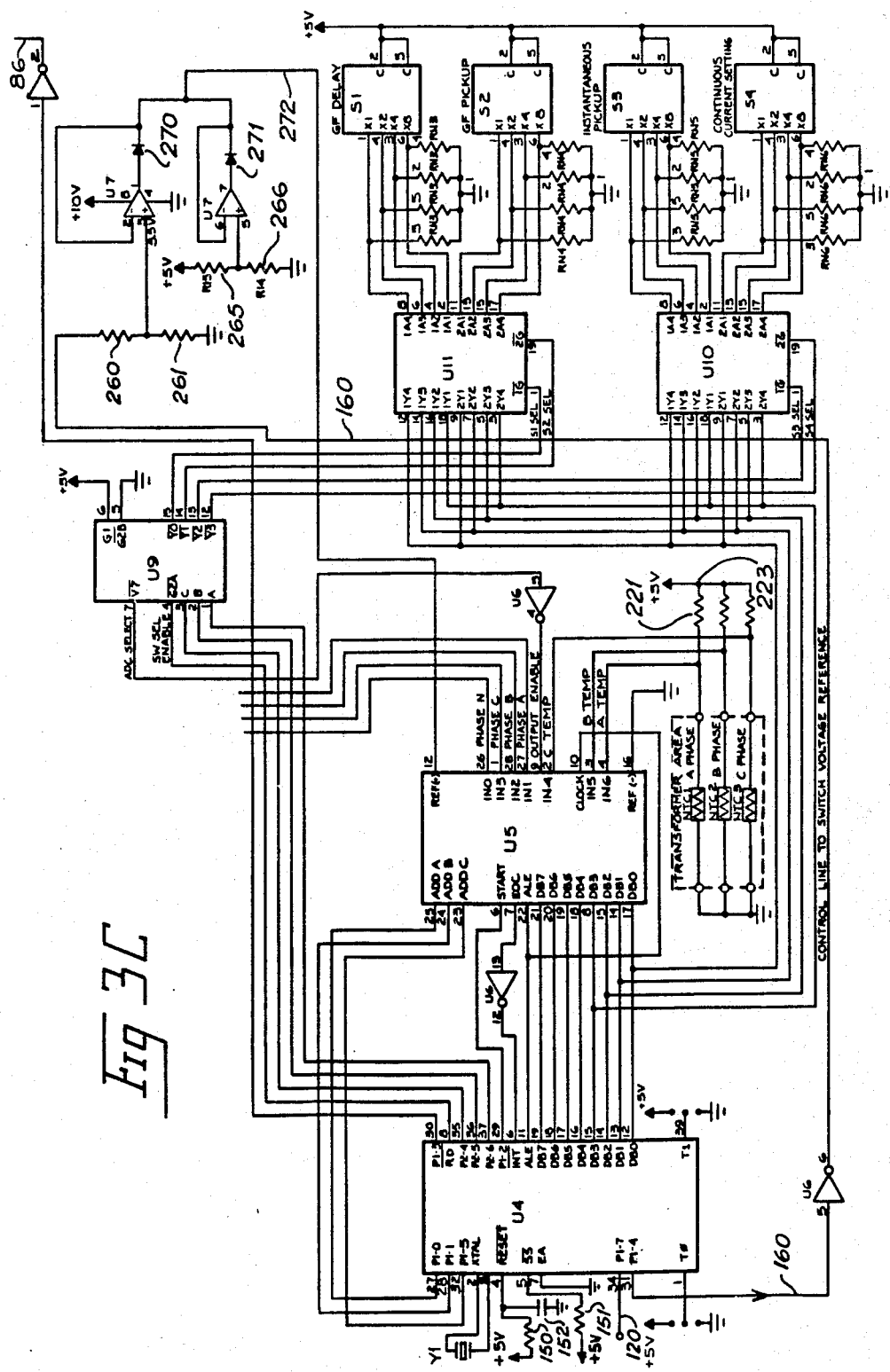

There is next described, the detailed circuit arrangement of the present invention, shown in FIGS. 3A, 3B and 3C. FIGS. 3A, 3B and 3C are parts of a single circuit diagram but are shown on separate drawing sheets for clarity. The interconnecting lines are correspondingly marked.

The rectifier 34 of FIG. 1 is shown in more detail in FIG. 3B as including the four single phase full wave bridges 60, 61, 62 and 63. These bridges receive inputs from the current transformers 30, 31, 32 and 33 for phases A, B, C and neutral N, respectively. The positive output terminal of each of the bridges 60–63 is connected to the positive output line 64 which leads to the power supply circuit of FIG. 3A.

FIG. 3A shows the power supply circuit and the schematically illustrated electromagnetic circuit breaker trip structure. The power supply circuit includes a Darlington arranged transistor switch 65, which can be type 2N6533 arranged to bleed off excess power which might be produced within the power supply. A transistor 66 is also provided which may be a type MPSA06 which is connected in circuit relation with Zener diodes 67 and 68 which may be types 1N5261B and 1N5240B, respectively. Zener diode 67 clamps line 64 to 47 volts maximum, while Zener 68 clamps the voltage to 10 volts. A filter capacitor 69 (1.5 microfarads) is also provided. Resistor 73 (1K) connects the anode of Zener 68 to the digital ground.

Also connected to positive line 64 is the main magnetic latch coil 80 of the circuit breaker and a shunt trip circuit 81 for the circuit breaker. Magnetic latch coil 80 is connected in series with diode 75 (type 1N4004) and SCR 82, which may be a type C103B, which is connected to the power supply ground circuit. The gate circuit of SCR 82 has a resistor 83 which may be a 1K resistor, and capacitor 84, which may be a 0.1 microfarad capacitor, connected thereto. A thermostat 85 is connected in parallel with the SCR 82 and may be type SCCRP85CS, which closes when the circuit breaker temperature exceeds 85° C., thus initiating a trip of the circuit breaker independently of the operation of the SCR 82.

An input trip signal is applied through diode 87 (1N4148) to the gate of SCR 82 over the trip signal line 86 which is derived from the microprocessor control of FIG. 3C, as will be later described.

Coil 80 consists of a winding having a 6650 turn winding section 80a, of 40 gauge wire and a 110 turn winding section 80b of 33 gauge wire. The resistances of windings 80a and 80b are 1150 ohms and 4.4 ohms, respectively. The windings are connected in series, and their connection point is connected to the anode of SCR 82 through Zener diode 80c, which is a type 5A26A Transzorb made by General Semiconductor, and capable of high current conduction, for example, 11 amperes. The use of separate wire sections 80a and 80b with Zener 80c permits the bypass of coil section 80a in the presence of a high voltage at line 64 which occurs during a high fault condition. Under this situation, the latch coil 80 should operate the latch in 3 to 4 milliseconds. To get this high speed operation, however, it is necessary to bypass coil section 80a, thereby to substantially reduce the time constant of the circuit. Since a high voltage is available, there are sufficient ampere turns provided from the high rate of rise of current in the 110 turn winding 80b to trip the magentic latch.

Also provided in FIG. 3A is a transistorized voltage regulator 90 which may be a type LM340LA50. Capacitors 91 and 92 are connected to pins 3 and 1 of the voltage regulator 90 and may be 15 microfarads and 1.5 microfarad, respectively. The regulated 5 volt output appears at pin 3 of regulator 90 and is used throughout the system where a 5 volt power supply is necessary. A 10 volt output is taken from pin 1 of regulator 90. Pin 2 is connected to circuit card.

The 5 volt output is also connected to resistors 95 and 96 which may have values of 2.7K and 10K, respectively, of the dual voltage reference circuit used for scale change. The node of resistors 95 and 96 is connected to positive pin 3 of operational amplifier (LM358AN) section 95a. Pins 1 and 2 of section 95a are connected through diode 96a (1N4148) to resistors 97a and 97b which are 1K and 6.2K resistors, respectively. The node of resistors 97a and 97b is connected to pin 6 of operational amplifier section 95b. Pin 7 of section 95b is then connected, through diode 98 (1N4148) and resistor 99 (2.7K) to trip signal input line 86. The input system voltage at node 50 is applied to resistor 51 (1K) and then to resistor 52 (6.2K) and capacitor 52a (0.1 microfarad).

There is next described the arrangement of FIG. 3B and the signal conditioners 36 of FIG. 1, the analog inverter 37 of FIG. 1 and the simultaneous sample and hold circuits 38 of FIG. 1. Referring to FIG. 3B, it will be noted that the negative signal on bridge connected rectifiers 60, 61, 62 and 63 is connected to precision resistors 100, 101, 102 and 103, respectively. Each of these resistors is a low value resistor, for example, 2.5 ohms at 2 watts with 1% accuracy. They may, for example, be beryllium oxide core resistors and are used to convert the current signal detected by the bridge connected rectifiers 60–63 into a voltage signal.

The signal on these signal resistors 100–103, however, is inverted and is below ground. Since the microprocessor to be described needs input signals which are inverted and above ground, the signals from the resistors 100–103 are connected to respective sections of operational amplifier U1 which inverts the signals. Operational amplifier U1 may be a type LM2243. Two resistor networks 110a, 110b, 110c, 110d and 111a, 111b, 111c, 111d, which may each be type 4308SIP, which contains 10K resistors, are interposed between resistors 100 and 103 and the operational amplifier U1, as shown, and provide the necessary biases to operate the operational amplifier U1 correctly.

The outputs on the circuit lines 115, 116, 117 and 118 then correspond to inverted voltage outputs related to the instantaneous current in phases A, B, C and in the neutral N respectively of the circuit of FIG. 1. In other words, these signals are directly related to the signals derived from current transformers 30, 31, 32 and 33, respectively. These signals are then applied to the OR circuit containing diodes 112a, 112b, 112c and 112d, respectively (1N4148), which are connected to node 50.

The signals are also applied to a quad bilateral switch U2 which contains four separate switches which are operable to sample the instantaneous value of the four signals on lines 115, 116, 117 and 118, respectively. Device U2 may be a device type CD4066.

In accordance with one aspect of the invention, these samples are simultaneously taken. Thus, the bilateral switches are closed to make a sample in each line simultaneously, by the control line 120 which comes from pin 34 (P1-7) of the microprocessor to be later described in connection with FIG. 3C. Line 120, when, activated will initiate a sampling operation of all four switches of U2 over the control input lines which are connected together at pins 12, 13, 5 and 6 of the switching device U2. Note that the lines 115, 116, 117 and 118 are connected to input/output pins 1, 4, 8 and 11, respectively of U2. The control line 120 is operated in such a manner that the switches of the switching device U2 are turned on and off every 1500 microseconds (approximately 11 times per cycle in a 60 cycle system). This sampling is repeated for 100 cycles to produce 1100 simultaneous samples for each of lines A, B, C and N in a given cycling interval.

The sampled signals are then applied to respective capacitors 130, 131, 132, and 133, corresponding to phase lines A, B, C and N, respectively. Capacitors 130–133 may each be 1000 picofarad capacitors. Each time one of the switches of switch unit U2 closes, it will be apparent that the appropriate capacitor 130 to 133 will charge. Respective sections of an operational amplifier U3 are connected to the outputs of the switches of switch unit U2. These act as voltage followers and serve to prevent excessive discharge of capacitors 130 to 133 during the sampling operation.

At the end of a complete sampling cycle, the net charge on each capacitor 130 to 133 will be related to the instantaneous current which was measured by current transformers 30–33, respectively. Note also that these measurements were made at simultaneous instants so that the data can be processed, not only to give true RMS data for each line, but also to calculate the ground fault current.

As will be seen in connection with FIG. 3C, the outputs of voltage follower U3 are digitized and then applied to the microprocessor of RMS and ground fault current.

Reference is next made to the components of FIG. 3C. FIG. 3C first shows the main microprocessor U4. In a preferred embodiment of the invention, microprocessor U4 is a type 80C49NEC in which the program for the system is "masked-in". Alternatively, the microprocessor may be the commercially available 8049NEC with an appropriate E PROM for providing a program which can be switch-selected to provide any desired trip characteristic.

A 6 MHz crystal Y1 is connected to pins 2 and 3 and reference voltage is connected to pins 4 and 5 through the resistor 150, resistor 151, and capacitor 152, which are 10K, 10K, and 0.1 microfarads, respectively. Pin 7 is connected to ground. Control line 120 which operates switches U2 of FIG. 3B is connected to pin 34 of microprocessor U4. Pin 31 is connected to line 160 and through inverter U6. The output of U6 is used to switch the voltage reference circuit as will be described.

A first jumper switch connected to pin 1 of microprocessor U4 allows the pin to be connected to 5 volts or ground for ground fault or no ground fault measurement, respectively. A second jumper, connected to pin 39, allows instantaneous trip or no instantaneous trip, respectively.

FIG. 3C next contains an analog to digital converter U5, which is preferably a type ADC0809. The output lines from pins 8, 14, 1 and 7 of converter U5 of FIG. 3B are connected to pins 26, 1, 28 and 27, respectively, of converter U5. A digital value, representative of the analog voltage of the above input pins is output to microprocessor from pins DB0 to DB7. An end of converstion signal EOC is output from pin 7 of converter U5, through a section of inverter U6 (a 74HC04 Hex inverter) to pin 6 of microprocessor U4. The start signal of U4 at pin 6 is derived from pin 29 of microprocessor U4. All other pin connections between microprocessor U4 and converter U5 are made as shown.

A 3 to 8 line decoder U9 is next provided and may be any desired type, for example, a type 74HC138. Also provided are two octal tri-state buffers U10 and U11 which are each type 74HC244.

Next provided in FIG. 3C are four 10 position binary coded decimal switches S1, S2, S3 and S4 which may each be type 230102GBBCD and which are operable for setting ground fault delay, ground fault pickup, instantaneous trip level and current setting, respectively. Resistor networks RN3, RN4, RN5 and RN6 are provided in the connectors between switches 51 to 54 and buffers U10 and U11 so that an open switch pulls down the signal.

There is finally provided in FIG. 3C a circuit for providing thermal memory which includes thermistors NTC1, 2 and 3, which may each be type 05DC103J-EC. These are mounted, preferably, on the conductors within the circuit breaker which serve as the primary windings of current transformers 30, 31 and 32, respectively. The thermistors are connected in series with resistors 220, 221 and 222, respectively, which may each be 30K. Signals representative of the thermal condition of the circuit breaker are then connected to the converter U5 and their digital value is loaded into microprocessor U4 to appropriately modify the trip characteristics of the breaker in accordance with its prior thermal history.

Next, shown in FIG. 3C is the novel dual reference voltage circuit. This circuit consists of the voltage divider having resistors 260 and 261 (6 and 14K, respectively) which are connected to the output at the lead 160. The node of resistors 260 and 261 is connected to pin 3 of operational amplifier U7 (a dual op-amp type LM358AN). Resistors 265 and 266 (12K and 1.5K, respectively) of a second voltage divider are also connected to 5 volts and their node is connected to pin 5 of a respective section of dual op-amp U7. Output pins 4 and 7 of U7 are connected to diodes 270 and 271, respectively, (each 1N4148) to output lead 272 which is connected to pin 12 of converter U5.

The potential at the node of resistors 260 and 261 is 3.5 volts, and the potential at the node of resistors 265 and 266 is 0.556 volt. If the voltage on line 160 from microprocessor U5 is 5 volts, the output on lead 272 is 3.5 volts, through diode 270. If, however, microprocessor U4 calls for a voltage reference change, the voltage on line 162 is zero and the output on line 272 is then 0.556 volts, through diode 271.

A number of test points are provided throughout the circuit of FIGS. 3A, B and C. These test points, 14 in number, are labeled TP1 to TP14 and are as follows:

TP1—(−) A Phase
TP2—(−) B Phase

TP3—(—) C Phase
TP4—(—) N Phase
TP5—(—) Mag. Latch
TP6—TEST POINT
TP7—TEST POINT
TP8—TEST POINT
TP9—INDEX POINT
TP10—+ Mag. Latch
TP11—+ N Phase
TP12—+ C Phase
TP13—+ B Phase
TP14—+ A Phase It is now possible to describe the operation of the novel system of FIGS. 3A, B and C and particularly to describe the processing of signals derived from capacitors 130, 131, 132 and 133. The flow chart of FIG. 2 is applicable to FIGS. 3A, B and C.

In order to start the system operation, the circuit breaker is closed but the microprocessor operation is prevented until the reference signal voltages are developed. Once the reference signal voltages are developed, the microprocessor reads the condition of the switches S1, S2, S3 and S4 which correspond to ground fault delay setting, ground fault pick-up setting, instantaneous pick-up setting and continuous current settings, respectively. These signals are applied from pins 1, 3, 4 and 6 of switches S1, S2, S3 and S4, respectively, to the input pins of tristate buffers U10 and U11. The outputs of the tristate buffers U10 through U11 are sequentially read at microprocessor pins 12, 13, 14 and 15, respectively and the desired trip characteristics for the device are appropriately set. Similarly, the outputs of the thermistors NTC1, NTC2 and NTC3 are read into the pins 4, 3 and 2, respectively, of converter U5 which converts the analog outputs of the thermistors into a digital signal on the output pins 17, 14, 15, 8, 18, 19, 20 and 21 of converter U5 into the corresponding pins of the microprocessor. The microprocessor then employs this thermal history information to appropriately adjust the points at which the circuit breaker will be tripped relative to the points at which a cold circuit breaker will trip.

Assuming now that the power supply is up and the breaker is successfully reclosed and remains closed, it will be assumed that a fault condition occurs on the A phase of the circuit breaker. Under this situation, a relatively high current will flow through bridge connected rectifier 60 of FIG. 3B through the darlington switch 65 to return to the other terminal of rectifier 60 through the ground circuit and resistor 100. The voltage across resistor 100 is inverted by the operational amplifier U1 with unity gain and is applied through diode 112a.

If the signal is so high that instantaneous trip override is required, the fault current will flow through resistor 51 to pin 5 of operational amplifier 95b and will cause an output at pin 7 sufficient to cause thyristor 82 to fire, thus operating the magnetic latch structure. If, however, the signal output through diode 112a is not sufficiently high to operate the operational amplifier 95b as described above, the output signal will appear at pin 1 of switch SWA of the quadbilateral switch U2. Note that all of the switches of the quadbilateral switch U2 open and close simultaneously in response to an output signal on line 120 taken from pin 31 of microprocessor U4.

When the switches U2 are closed, capacitors 130 to 133 charge to values related to the input signals coming from respective sections of operational amplifier U1. Since a fault current existed in phase a, capacitor 130 is more highly charged than the other capacitors 131, 132 or 133. When line 120 causes all of the switches U2 to open, the signal on capacitors 130 to 133 are applied through the voltage follower consisting of the operational amplifier sections U3. Operational amplifier U3 has unity gain to substantially limit the current drain on the capacitors 130 to 133.

The analog to digital converter U5 can do only one conversion at a time. The microprocessor U4 selects which of the phases or neutral is to be converted, for example, in an orderly sequence of phase A, phase B, phase C and neutral.

Once the analog to digital conversion is performed on the phase A signal in its turn, the microprocessor reads out an 8-bit value from converter U5, which corresponds to the voltage on the capacitor 130. In sequence, the microprocessor reads and stores all of the values from converter U5 which were simultaneously input from the operational amplifier U3. Thereafter, under the influence of the program, the microprocessor U4 adds all four values taken from phases A, B, C and neutral and calculates the ground fault current, if any. If a ground fault current beyond a given magnitude is measured, the microprocessor puts out a signal to initiate the firing of thyristor 82. Note that the microprocessor in performing the analysis will examine the individual values to determine peak average value for the short time trip operation.

The microprocessor U4 also uses the measured values as individual samples to calculate true RMS values for the long time over current trip function. Two hundred fifty-six samples are required to produce a single RMS value. In turn, several RMS values must be measured before a trip operation can be initiated. The calculation of a single RMS value with the system of the present invention takes approximately 1.2 seconds.

Once the microprocessor decides for any reason to fire the thyristor 82, an output signal is applied to pin 30 (P1-3) which signal is applied through U6 to the gate of thyristor 82.

Note that when the circuit is first started, a start conversion signal is needed. This start signal is taken from pin 29 of microprocessor U4. The end of conversion signal is produced by converter U5 at pin 7 which causes the generation of a new start signal from the microprocessor pin 29 to start a new conversion signal.

The voltage reference signal from operational amplifier U7 is applied over line 272 to the pin 12 of converter U5. The microprocessor U4 will make a decision as to whether this reference voltage should be high or low, depending upon the current value being measured during the fault condition. Thus, microprocessor U4 will put out an appropriate signal on pin 30 through inverter U6 over line 160 in order to switch the voltage reference in the desired manner, thus producing the novel scaling operation of the present invention which has been previously described.

The circuit connected to pins 5 and 6 of microprocessor U4 contains resistors and capacitors which provide the necessary reset function. Thus, when the breaker first closes and the power supply is not yet reached its normal output, the reset will be held for approximatey 1 millisecond and until power is available.

The operation of the microprocessor will be under the control of a suitable program. One program which has been used successfully is appended hereto.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A microprocessor based circuit breaker trip unit comprising, in combination:
   a plurality of current transformers connected to corresponding lines of a multiphase circuit which are connected to respective poles of said circuit breaker;
   a trip mechanism energizable to open said poles of said circuit breaker;
   respective signal conversion means connected to said plualtiy of current transformers for converting the current output of said current transformers to respective voltage signals;
   respective sample and hold circuits for repetitively and simultaneously sampling and holding sample analog values of each of said voltage signals for a predetermined number of samples;
   analog-to-digital converter means connected to each of said respective sample and hold circuits for converting the analog value produced in said sample and hold cirucit after said predetermined number of samples of a corresponding digital value;
   a microprocessor means coupled to each of said analog-to-digital converters for computing a true RMS value of the current of each of said line from said predetermined number of samples; and
   an output circuit means connected between said microcomputer and said trip mechanism for operating said trip mechanism in response to predetermined current conditions.

2. The trip unit of claim 1, wherein said microcomputer is an 8-bit circuit.

3. The trip unit of claim 2, wherein said microcomputer further includes means for computing ground fault current from the simultaneous samples of current in said lines.

4. The trip unit of claim 1, wherein one of said lines is a neutral.

5. The trip unit of claim 2, wherein one of said lines is a netrual.

6. The trip unit of claim 2 or 5, wherein said microcomputer further includes means for computing ground fault current from the simultaneous samples of current in said lines.

7. The trip unit of claim 1 which further includes thermal memory means coupled between said lines and said analog-to-digital converter means; said thermal memory means producing an output related to the instantaneous thermal energy stored in said circuit breaker and circuit means coupling the digital output of said analog-to-digital converter, which is related to said output of said thermal memory means to said microcomputer for modifying the trip timing operation of said trip unit after said circuit breaker is closed, to account for its prior thermal history.

8. The trip unit of claim 7, wherein said thermal memory means includes first, second and third thermistors fixed to the conductors of respective poles of said circuit breaker.

9. The trip unit of claim 1, wherein said sample and hold circuits include respective switch circuit means and respective capacitor means, whereby each time said lines are sampled, all of said switch circuit means for each of said lines simultaneously closes, and adds charge to its respective said capacitor means of a value related to the voltage signal amplitude during the sampling instant.

10. The trip unit of claim 1 wherein said trip mechanism includes a magnetic latch and a semiconductor switching device, said magnetic latch containing a latch operating winding which is connected in series with said semiconductor switching device, said semiconductor switching device having a control electrode connected to said output circuit means to be switched into conduction in response to a given output from said output circuit means; said winding consisting of a series connected large turn, high resistance section and a relatively low turn, relatively low resistance section; and bypass switching means connected from the node of said series connected sections to said semiconductor switching device whereby, when the output voltage in series with said winding and said switching device exceeds a given value, said bypass switching device conducts and short-circuits said large turn, high resistance section.

11. A microprocessor based circuit breaker trip unit comprising, in combination:
    a plurality of current transformers connected to corresponding lines of a multiphase circuit which are connected to respective circuit breaker poles;
    a trip mechanism energizable to open said circuit breaker poles;
    respective signal conversion means connected to said plurality of current transformers for converting the current output of said current transformers to respective voltage signals;
    respective sample and hold circuits for repetitively and simultaneously sampling and holding sample analog values of each of said voltage signals for a predetermined number of samples;
    analog-to-digital converter means connected to each of said respective sample and hold circuits for converting the analog value produced in said sample and hold circuit after each of said predetermined number of samples to a corresponding digital value;
    a microcomputer means coupled to each of said analog-to-digital converters for computing a true RMS value of the currents of each of said lines;
    an output circuit means connected between said microcomputer and said trip mechanism for operating said trip mechanism in response to predetermined current conditions; and
    autoscaling circuit means connected to said microcomputer for dividing a given current range into a firt small range and a second larger range in values of amperes per bit of said microprocessor.

12. The trip unit of claim 2, 4, 3 or 11 which further includes thermal memory means coupled between said lines and said analog-to-digital converter means; said thermal memory means producing an output related to the thermal energy stored in said circuit breaker and circuit means coupling the digital output of said analog-to-digital converter, which is related to said output of said thermal memory means to said microcomputer for modifying the trip timing operation of said trip unit after said circuit breaker is closed, to account for its prior thermal history.

13. The trip unit of claim 12, wherein said sample and hold circuits include respective switch circuit means and respective capacitor means, whereby each time said lines are sampled, all of said switch circuit means for each of said lines simultaneously closes, and adds charge to its respective said capacitor means of a value related to the voltage signal amplitude during the sampling instant.

14. The trip unit of claim 12, wherein said thermal memory means includes first, second and third thermistors fixed to the conductors of respective poles of said circuit breaker.

15. A microprocessor based circuit breaker trip unit comprising, in combination:
a plurality of current transformers connected to corresponding lines of a multiphase circuit which are connected to respective poles of said circuit breaker;
a trip mechanism energizable to open said poles of said circuit breaker;
respective signal conversion means connected to said plurality of current transformers for converting the current output of said current transformers to respective voltage signals;
respective sample and hold circuits for repetitively and simultaneously sampling and holding sample analog values of each of said voltage signals for a predetermined number of samples;
analog-to-digital converter means connected to each of said respective sample and hold circuits for converting the analog value produced in said sample and hold circuit after each of said predetermined number of samples to a corresponding digital value;
a microcomputer means coupled to each of said analog-to-digital converters for computing a true RMS value of the currents of each of said lines;
said microcomputer includes means for computing ground fault current from the simultaneous samples of current in said lines;
an output circuit means connected between said microcomputer and said trip mechanism for operating said trip mechanism in response to predetermined current conditions and;
autoscaling circuit means connected to said microcomputer for dividing a given current range into a first small range and a second larger range in values of amperes per bit of said microcomputer.

16. A process for operating the trip unit of a multipole a-c circuit breaker which protects a circuit having a plurality of a-c lines; said process comprising the steps of producing a current signal for each of said lines which is proportional to the instantaneous current in said line; converting each of said current signals to respective voltage signals which are proportional to said current signals; simultaneously, and repetitively measuring the amplitudes of each of said voltage signals for relatively short sampling time; converting the analog value of the amplitudes of said voltage signal to a digital value; and separately calculating the true RMS value of each of said voltage signals by taking the square root of the sum of the squares of each of the digital values measured.

17. A trip unit for a circuit breaker comprising, in combination:
a plurality of current transformers connected to corresponding lines of a multiphase circuit which are connected to respective poles of said circuit breaker;
a trip mechanism energizable to open said poles of said circuit breaker;
respective signal conversion means ocnnected to said plurality of current transformers for converting the current output of said current transformers to respective voltage signals;
an output circuit means connected between said current transformers and said trip mechanism for operating said trip mechanism in response to predetermined current conditions;
said trip mechanism including a magnetic latch and a semiconductor switching device; said magnetic latch containing a latch operating winding which is connected in series with said semiconductor switching device;
said semiconductor switching device having a control electrode connected to said output circuit means to be switched into conduction in response to a given output from said output circuit means;
said winding consisting of a series connected large turn, high resistance section and relatively low turn, relatively low resistance section; and
bypass switching means connected from the node of said series connected sections to said semiconductor switching device whereby, when the output voltage in series with said winding and said switching device exceeds a given value, said bypass switching device conducts and shortcircuits said large turn, high resistance section.

18. A method of operating a circuit breaker trip unit with the use of a microprocessor comprising the steps of:
providing said microprocessor with predetermined current data for said trip unit;
initiating a sample interval timer in said microprocessor upon the start or the sampling period to sequence the samples taken by a plurality of sample and hold circuits;
constantly determining the voltage of each sample and hold circuit at the end of each sample interval;
constantly providing the microprocessor with a digitally converted signal voltage and current samples until the end of the sampling period;
repetitively storing in the microprocessor the sampled current value for 1100 sample times to calculate the total current during the sampling period;
repetitively comparing in the microprocessor the sample time calculated with the root-mean-square equation and said elapsed time; and
opening the circuit breaker trip unit when the calculated true RMS value indicates an occurrence of at least a predetermined current condition.

* * * * *